July 25, 1967 E. P. COLALILLO 3,333,085
CONTROLS FOR ELECTRICAL APPARATUS
Filed Sept. 25, 1964
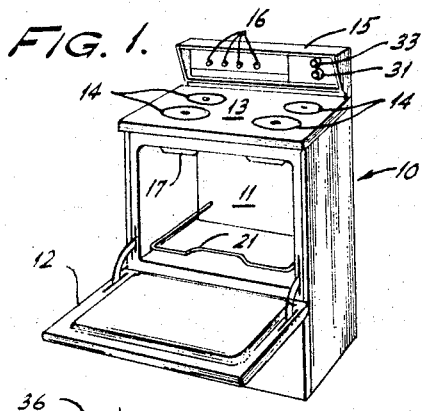
FIG. 1.
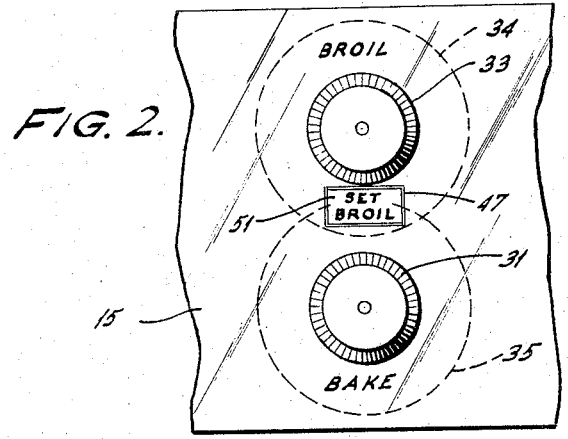
FIG. 2.
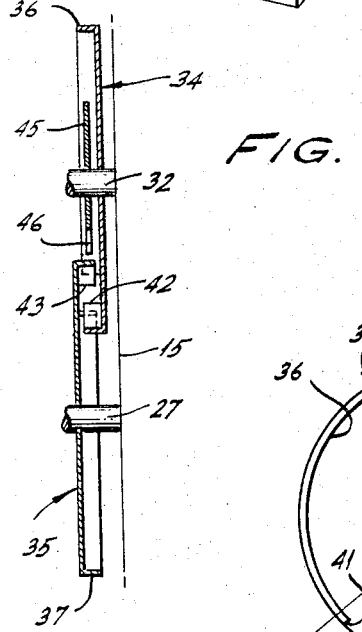
FIG. 4.
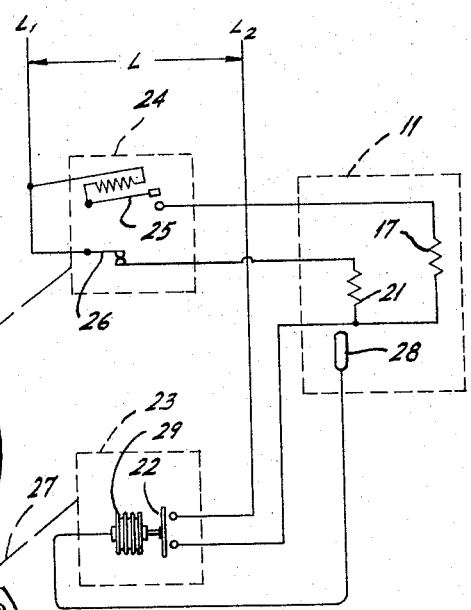
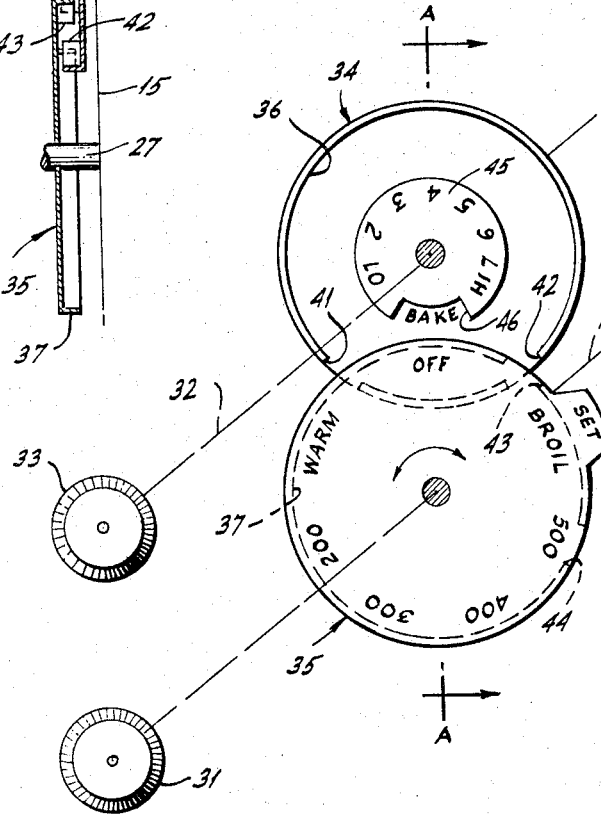
FIG. 3.
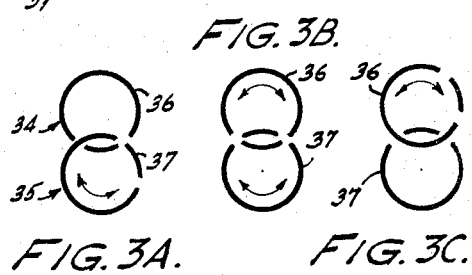
FIG. 3A. FIG. 3B. FIG. 3C.
INVENTOR.
EDWARD P. COLALILLO
BY
Harry W. Hargis III
AGENT

United States Patent Office 3,333,085
Patented July 25, 1967

3,333,085
CONTROLS FOR ELECTRICAL APPARATUS
Edward P. Colalillo, Cherry Hill, N.J., assignor to Philco-Ford Corporation, a corporation of Delaware
Filed Sept. 25, 1964, Ser. No. 399,283
10 Claims. (Cl. 219—398)

This invention relates to controls for electrical apparatus, and more particularly to mechanical interlock means for such controls. While of broader applicability, the invention has particular utility in the interlocking of controls for broiler and oven heating elements, whereby predetermined combinations of energized heating elements are insured for baking and broiling operations.

In providing for the baking operation in a cooking oven of known construction, a predetermined fixed percentage of oven heat is usually supplied by the broil heater unit under control of an adjustable temperature controlling switch, and the remainder of the heat is supplied by the bake heater unit. Both units are under control of a selectively adjustable, main, thermostatically actuated switch. In providing for the broiling operation, the broil switch is adjustable to a position in which the bake heater unit is not operable and a predetermined amount of heat is supplied by the broil heater unit alone. A disadvantage of apparatus of this known type is that it is possible either to bake or to broil with the controls improperly set. For example, the controls may be set improperly to bake with the bake unit deenergized and the boil unit energized at some low heat output value. Also, the controls may be set improperly to broil with the thermostatic switch set at too low a temperature, which results in undesirable low temperature cycling of the broil heater unit.

It is therefore an objective of the invention to provide means for interlocking elements of a plurality of oven controls to prevent improper control settings.

It is a further specific objective of the invention to provide novel broil control and bake control interlock means preventing operation of the bake heater element when the broil control is set to energize the broil heater element.

In fulfillment of the foregoing as well as other objectives, a preferred embodiment of the invention comprises the combination of a broil heater, a bake heater, individual controls for said heaters, and mechanical interlock means movable with each said control and operable to ensure predetermined combinations of heater energization during either a bake or a broil operation. The interlock means may take several forms within the broad contemplation of the invention, and preferably comprises a pair of overlapping disks having parallel spaced axes, said disks having peripheral flanges presented toward one another and each provided with a pair of slots permitting free passage of one flange through the slots of the opposed flange only under predetermined relative angular positions of said disks which establish the desired predetermined combinations of control settings.

For a better understanding of the invention, and the manner of achievement of the foregoing objects and advantages, reference is made to the following description taken in light of the accompanying drawing in which:

FIGURE 1 is a perspective showing of a range apparatus embodying the invention;

FIGURE 2 is an enlarged fragmentary portion of the apparatus seen in FIGURE 1 and illustrating a feature of the invention;

FIGURE 3 is a diagrammatic showing of electric circuit means usable in combination with the apparatus of the invention;

FIGURES 3A, 3B, and 3C are diagrammatic showings of a portion of FIGURE 3, illustrating operational features of the invention; and FIGURE 4 is a sectional view of apparatus shown in FIGURE 3, looking in the direction of arrows 4—4 applied to the latter figure.

With more particular reference to the drawing, and first to FIGURE 1 thereof, the invention is shown as embodied in an electric range comprising a cabinet 10 provided with an oven compartment 11 and a door 12 for closing the same. The top wall 13 of cabinet 10 includes conventional surface units 14, and the backsplash panel 15 houses controls 16 for units 14. These units and their controls, while shown in the interest of completeness, form no part of the present invention and will not be described further in the present disclosure.

In particular accordance with the invention, and with reference also to the solid line schematic electrical diagram shown in FIGURE 3, a pair of electrical resistance heating elements 17 and 21 are disposed and arranged within oven compartment 11 to heat the same. Heating elements 17 and 21 are connected in parallel electrical circuit with one another and each is disposed in series electrical circuit with line L2 of a source of energy L, and with a thermostatically actuated switch 22 of thermostat 23. Broiler control 24 comprises a temperature controlling switch 25, preferably of the so-called "infinite" type, connected in series electrical circuit with broil heater 17 and line L1, and with a selector switch 26 connected in series electrical circuit with bake heater 21 and line L1.

Thermostat 23 may be of a suitable known type, for example of the usual fluid actuated type, including a switch-actuating bellows 29 and a sensing bulb 28, disposed in thermal exchange relation with the interior of oven 11. With reference also to FIGURE 2, thermostatically actuated switch 22 is selectively adjustable between a plurality of temperature settings, by means of a shaft 27 and a knob 31 affixed thereto.

Also in accordance with known practice, shaft 27 is operable by knob 31 selectively to open and close switch contacts 22 of the thermostat.

The switch 25 and selector switch 26 are selectively adjustable by a rotatable shaft 32 provided with a knob 33. The selector switch 26 may be either opened or closed by rotating knob 33 and, when switch 26 is opened, the desired amount of broil heater energization to be provided by switch 25 may be selected, as will hereinafter be more fully described in connection with operation of the apparatus.

In particular accordance with the invention, and with reference also to FIGURE 4, shafts 27 and 32 include respectively, disks 35 and 34. Disks 35 and 34 are coperable with one another, serving as mechanical interlock means movable with their respective control shaft and with the above described switches to establish predetermined heater energizations for either bake or broil operations. In achievement of the interlock, disk 34 overlaps disk 35, and the disks have respective peripheral flanges 36 and 37 presented toward one another. Flange 36 is provided with a pair of slots 41 and 42 through which flange 37 is free to move, when disks 34 and 3 occupy predetermined relative angular positions, which positions are illustrated in FIGURES 3, 3A, and 3B. Similarly, flange 37 is provided with a pair of slots 43 and 4 through which flange 36 is free to move under other predetermined relative angular positions of disks 34 and 3: illustrated in FIGURE 3C.

A smaller disk 45 is carried by shaft 32 and is spaced a short distance from disk 34 as is best seen in FIGUR 4. Disk 45 includes a generally arcuate notch 46 extending substantially through the acute angle defined by radii passing through slots 41 and 42 in flange 36.

Disk 45 bears indicia relating to the several amoun of heat available from broil heater 17 for the broil period This indicia is visible through a rectangular window 47 panel 15 (FIGURE 2) in selection of a desired broil period of operation. Additional indicia are carried by disk 34 and aligned with notch 46 also for viewing through the window 47.

A tab 51 extends beyond the rim of disk 35 and is disposed intermediate slots 43 and 44 in flange 37. Tab 51 is movable upon rotation of disk 35 to a position aligned with notch 46 and window 47, and provides the "Set Broil" indicia illustrated in FIGURE 2. Tab 51 further is disposed in a plane between disks 45 and 34, whereby rotation of knob 33, to energize broil heater 17 in any of its settings identified by indicia applied to disk 45, will move disk 45 so that its solid portion hides from view tab 51 and its associated indicia, and the user then reads the word "Broil."

The invention will be appreciated still further from a consideration of the following description of the operation of the disclosed apparatus in providing the bake and broil periods.

*Bake period*

Considering first the relative control settings illustrated in FIGURES 3 and 3A, disks 34 and 35 are so positioned that the indica aligned with window 47 reads "Bake Off." As seen from the relative positions of slots 41, 42, 43, and 44, and as emphasized by the rotational arrows, only the bake heater control knob 31 is free to turn when this indicia is visible. In this locked position of shaft 32, switch 25 is conditioned by shaft 32 to cycle at some suitable rate to energize broil heater 17 to assist bake heater 21 in the baking period. Also, shaft 32 in this position actuates switch 26 to closed position, thereby completing the energizing circuit for bake heater 21. Although switch 22 is moved to open position in the illustrtaed position of shaft 27, rotaton of this shaft in a clockwise direction to a desired temperature setting (in which the corresponding baking temperature, i.e. warm, 200, 300 etc., is visible through window 47 along with the word "Bake") will initially close switch 22, energizing both the bake and the broil heaters. Having thus set the controls, both heaters will be cycled through the desired baking temperatures under the control of thermostat 23.

*Broil period*

In order to provide for a broil period and with reference to FIGURES 2, 3B, and 3C, bake control knob 31 is moved to position the disks in accordance with FIGURE 3B, in which position the indicia "Set Broil" is visible in window 47, and switch 26 is in its open position. In accordance with the directional arrows applied to disk 34 in FIGURES 3B and 3C, the desired broil setting is attainable by rotating knob 33. Rotation of knob 33 leaves the word "Broil" visible in the window and the word "Set" is covered by the solid portion of disk 45 bearing the broil setting indicia (i.e. Lo, 2, 3, 4, 5, 6, 7, Hi), which indicia then is visible through window 47 with the word "Broil."

While the invention has been described in combination with electric range bake and broil controls, it will be appreciated that it is susceptible of use in other electrical circuit arrangements where it is desired to establish, automatically, predetermined combinations of electrical circuit elements, to the exclusion of undesired combinations thereof, upon operation of individual controls associated with each circuit element.

I claim:
1. An interlocking system for a pair of angularly movable elements, each capable of being moved between first and second positions, comprising: a first disk mounted for rotation with one of said elements and including an axially extending peripheral flange having a pair of spaced, axially extending slots, and a second disk mounted for rotation with the other of said elements and positioned so that it overlaps said first disk, said second disk including an axially extending flange presented toward the flange of said first disk and having a pair of spaced, axially extending slots, said slots of each pair being spaced substantially equally, the flange of one disk being rotatably positionable to extend with clearance through both slots of the flange of the other disk, and the other disk then being prevented from rotating by the solid flange of the recited one disk.

2. The combination according to claim 1 and characterized in that said angularly movable elements comprise the control shaft means for a pair of electrical switches.

3. The combination according to claim 2 and characterized in that one of said switches is operable to control the broil heater circuit and the other of said switches is operable to control the bake heater circuit of an electric range, said interlocking system being operable to ensure energization of the required circuit for either a broil or a bake operation.

4. In electrical control apparatus, a pair of rotatably operable switch means, each having an off position and an operating position, a first generally disk-shaped member rotatable with one of said switch means, a second generally disk-shaped member rotatable with the other of said switch means and disposed in overlapping relationship to said first disk-shaped member, each said member having an axially extending peripheral flange, with said flanges presented toward one another, each said flange including a pair of spaced slots, the spacing of one pair of slots being equal to the spacing of the other pair, said flange of one disk-shaped member being positionable upon rotation of its associated switch means to extend with clearance through the spaced slots of the other disk-shaped member, in such position said other disk-shaped member and its associated switch means being prevented from rotating by interference of the flange of the one disk with portions of said flange of the other disk adjacent its slots.

5. Apparatus according to claim 4 characterized in that it comprises an electric oven provided with a bake heater and a broil heater, one of said switch means being operable to energize said broil heater alone in performance of a broil operation, and the other of said switch means being operable to effect concurrent energization of said bake and broil heaters in performance of a bake operation.

6. Apparatus according to claim 5 further characterized by the inclusion of a source of energy, said one switch means comprising an infinite switch connected in series circuit with said broil heater and said source of energy and an on-off switch connected in series circuit with said bake heater and said source of energy, and said other switch comprising a thermostatically actuated switch responsive to oven temperatures and connected in series circuit with said source of energy each of said bake and broil heaters, the latter being in parallel circuit with one another, the construction and arrangement being such that for a bake operation said on-off switch is closed, said infinite switch is operable to energize said broil heater and said thermostatic switch is operable to control energization of both said bake and said broil heaters to establish a desired baking temperature, and for a broil operation said on-off switch is held open and said infinite and thermostatic switches are operable to control energization of said broil heater to establish a desired broiling temperature.

7. Apparatus according to claim 4 characterized in that it comprises an oven of a cooking range provided with a bake heater circuit and a broil heater circuit, one of said switch means being operable to control energization of said broil heater circuit and the other of said switch means being operable to control energization of said bake heater circuit, one circuit being operable to the exculsion of the other.

8. In an electric range, first and second electrical circuit means, a source of energy for said circuit means, and individual control means for each of said circuit means, comprising: a first switch means for coupling said first circuit means to said source of energy; a second switch means for coupling said second circuit means with said source of energy; first rotatable disk means movable with said first switch means as it is actuated to couple said first circuit means with said source of energy, said first disk means including a generally laterally presented arcuate portion having a pair of spaced slots; second disk means associated with said second switch and said source of energy in like manner, said second disk means including a generally laterally presented arcuate portion arranged to move through the slots of said first disk means and also having spaced slots, the arcuate portion of said first disk means also being arranged to move through the slots of said second disk means, one of said arcuate portions; and when moved into a slot of the other arcuate portion preventing rotation of the corresponding other disk means, whereby only one circuit at a time may be coupled with said switch means.

9. In a range oven having broiler coil means and baking coil means, control apparatus, including: switch means for adjusting the heat output of each coil means; a pair of manually operable members for controlling said switch means to effect such heat adjustment and to set the oven for either baking or broiling operation; and stop means associated with each said member and disposable in such interference relation with the other member as to prevent adjustment of said broiler coil means when the oven is set for baking operation, and to prevent adjustment of said baking coil means when the oven is set for broiling operation.

10. In a range oven having a broiler coil and a baking coil, control apparatus, including: a switch for adjusting the heat output of said broiler coil; a switch for adjusting the heat output of said baking coil; a pair of manually rotatable knobs each associated with a corresponding one of said switches for controlling the same to effect such heat adjustment and to set the oven for either baking or broiling operation; and stop means associated with each said rotatable knob and disposable, in response to knob rotation, in such interference relation with the stop means of the other knob as to prevent adjustment of said broiler coil when the oven is set for a baking operation, and to prevent adjustment of said baking coil when the oven is set for a broiling operation.

References Cited

UNITED STATES PATENTS

| | | | |
|---|---|---|---|
| 2,368,488 | 1/1945 | Ogden | 219—508 X |
| 2,389,472 | 11/1945 | Tyzzer | 338—129 X |
| 2,402,354 | 6/1946 | Waddell | 219—508 X |
| 2,526,234 | 10/1950 | Huck | 219—508 X |
| 2,725,451 | 11/1955 | Huck et al. | 219—485 |
| 3,092,706 | 6/1963 | Chisholm | 219—485 X |
| 3,172,302 | 3/1965 | Jones et al. | 74—483 |
| 3,202,013 | 8/1965 | Strader | 74—483 |

RICHARD M. WOOD, *Primary Examiner.*

C. L. ALBRITTON, *Assistant Examiner.*